C. E. JEFFERS.
CLUTCH.
APPLICATION FILED JULY 26, 1917.
1,285,718.
Patented Nov. 26, 1918.
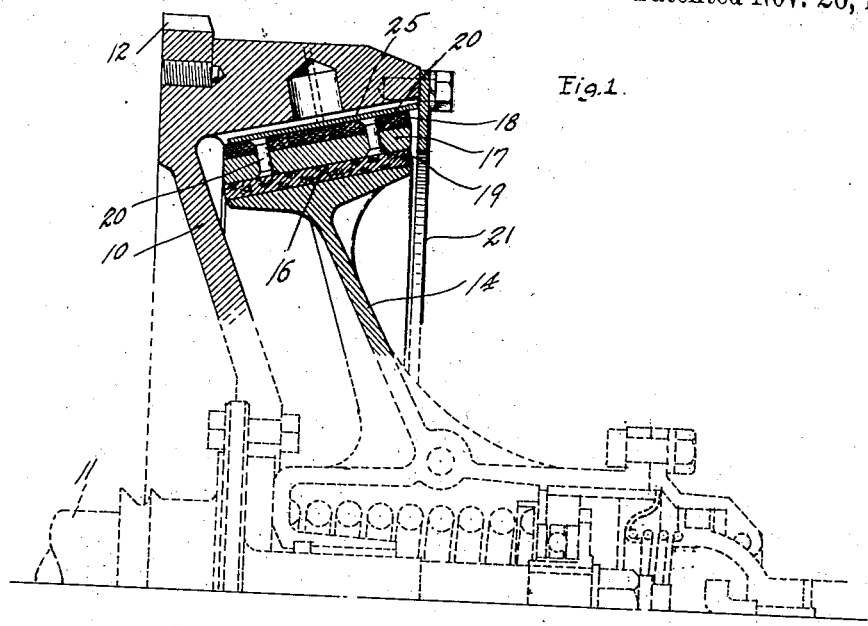
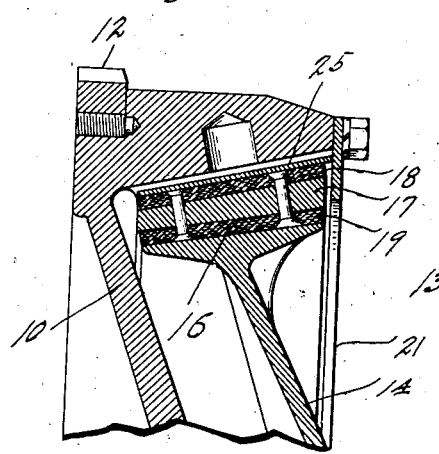
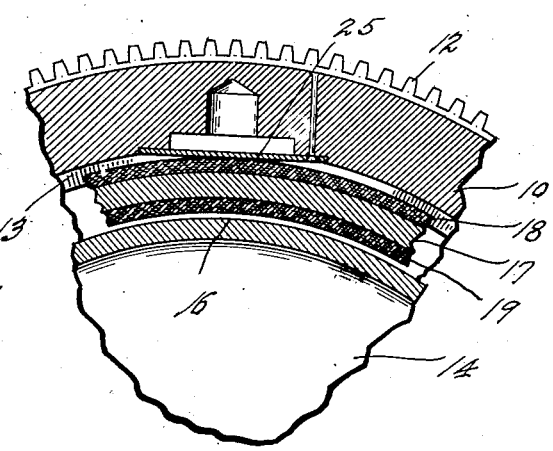
Witness
Frank A. Kahl
Inventor
Clarence E. Jeffers,
By Hood & Ashley
Attorneys

UNITED STATES PATENT OFFICE.

CLARENCE E. JEFFERS, OF INDIANAPOLIS, INDIANA, ASSIGNOR TO HOWARD MARMON, OF INDIANAPOLIS, INDIANA.

CLUTCH.

1,285,718.  Specification of Letters Patent.  Patented Nov. 26, 1918.

Application filed July 26, 1917. Serial No. 182,811.

*To all whom it may concern:*

Be it known that I, CLARENCE E. JEFFERS, a citizen of the United States, residing at Indianapolis, in the county of Marion and State of Indiana, have invented a new and useful Clutch, of which the following is a specification.

It is the object of my invention to provide a clutch which does not grab and in which the driven part of the clutch has very small inertia, so that when the clutch is set the driven part is started easily, and when the clutch is released the momentum of the driven part if it is in motion will not be sufficiently great to cause such motion to continue very long. By thus cutting down the momentum of the driven part of the clutch, I cause it to slow down more rapidly when the clutch is released. This is of especial advantage in automobiles, particularly when shifting gears, as when the clutch is released at the beginning of a gear shift and then the gear shift lever is thrown to neutral position the driven part of the clutch and the transmission shafting between the clutch and the shifting gears will slow down quickly because of the small momentum, thereby permitting the gear shift lever to be thrown to the next gear position more rapidly and with less liability of gear clashing, and also eliminating any necessity for a transmission brake; in addition, because of the small inertia of these parts, a movement of the gear shift lever to throw in the gears at an improper time will produce less strain on the meshing parts.

In carrying out my invention, I provide a floating clutch element which carries the friction material of the clutch and is located between the driving and driven members, and arranged so that it is released from the two members of the clutch successively, preferably from the driving member first.

The accompanying drawing illustrates my invention. Figure 1 is a fragmentary sectional view through a clutch embodying my invention, with different friction materials employed for the frictional surfaces; Fig. 2 is a similar view with the same friction materials employed for the two frictional surfaces; and Fig. 3 is a fragmentary transverse section with the clutch released.

The driving member 10 of the clutch may also be the fly wheel of the engine, as is common in automobile construction, and is mounted on the engine crank shaft 11 in any suitable manner. It may be provided with an external gear 12 for a starter drive connection, if desired. This driving member 10 is provided with an internal frusto-conical clutch surface 13.

The driven member 14 of the clutch is longitudinally slidable in the usual manner, and is provided with any desirable means for shifting it longitudinally. It may be quite light in construction, and is provided with an external frusto-conical clutch surface 16 smaller than the clutch surface 13 of the driving member 10.

Between the two clutch surfaces 13 and 16 is located a frusto-conical floating ring 17. On the outer and inner surfaces of this floating ring are mounted layers of any suitable friction material 18 and 19 for engaging the clutch surfaces 13 and 16 respectively, with which surfaces they correspond in shape. The friction material 18 and 19 may be fastened to the ring 17 in any suitable manner, usually being riveted thereto by rivets 20 if the friction material is of the nature of leather or of many of the usual composition friction materials, as indicated for the friction material 18 in Fig. 1, and shellacked or glued thereto if the friction material is of the nature of cork or of cork composition, as indicated for the friction material 19 in Fig. 1. The tapers of the two frusto-conical surfaces 13 and 16 are so arranged with relation to the co-efficients of friction of such surfaces with the friction material 18 and 19 that when the clutch is released the floating element separates from the two surfaces 13 and 16 successively, preferably from the surface 13 first. This may be accomplished in various ways, as by providing friction material with different co-efficients of friction with the clutch surfaces 13 and 16, as illustrated in Fig. 1 where the co-efficient of friction of the leather or composition friction material 18 with the surface 13 is less than that of the cork 19 with the surface 16, in which case the tapers of the two frusto-conical surfaces 13 and 16 may be the same; or by providing friction material with the same co-efficient of friction with such clutch surfaces, as illustrated in Fig. 2 where both friction materials 18 and 19 are shown as being leather or composition friction material, in which case the angle between the elements of the clutch surface 13 and the axis of the clutch is preferably greater than that of the elements of the clutch surface 16 with such axis. In either of these constructions, when the clutch is released, by moving the driven member 14 to the right in relation to the driving member 10, the friction material 18 lets go of the clutch surface 13 first, and afterward the friction material 19 lets go of the clutch surface 16. In order to obtain this second action, the driving member 10 has fixed thereto at the larger end of its frusto-conical surface 13 a ring 21 which projects into the path of axial movement of the floating ring 17, so that when the clutch is released and the friction material 18 has separated from the clutch surface 13 the floating ring 17 strikes the ring 21 and is prevented from further axial movement relative to the driving member 10; thus requiring the separation of the friction material 19 from the clutch surface 16 upon further movement of the driven member 13 to the right.

Thus when the clutch is released, the floating ring 17 and the friction materials 18 and 19 are separated from the driven member 14, so that such driven member is relieved of the momentum due to the weight of the friction material and the necessarily rather heavy part which carries it. This permits rapid variations in speed in the driven member 14, without shock, and causes such driven member to decrease in speed rapidly when the clutch has once been released, thus facilitating shifting of gears in an automobile by reason of the more rapid slowing down of the transmission shaft, eliminating the necessity for a transmission brake or diminishing the work of such transmission brake if it is used, and lessening the strain on the parts if the shifting gears are thrown into mesh when the meshing parts are not moving at the same speed.

When the clutch is set, the clutch surface 16 engages the friction material 19 first and then forces the floating element to the left to bring the friction material 18 into engagement with the clutch surface 13. This produces a clutch setting without grabbing, by reason of this successive action and of the sliding which is permissible on both clutch surfaces. Preferably I use any suitable pick-up devices 25 in connection with either or both separable sets of surfaces either under the friction material or on the coöperating clutch surface. I have shown such pick-up disks 25 on the clutch surface 13 in Figs. 2 and 3. These pick-up disks are resilient flat members, and are supported only at their opposite edges, the surface 13 being grooved behind the central parts of said disks; so that the disks are chords of the circle formed by the surface 13, but may be flexed toward such circle. Thus when the clutch is set the friction material 18 first engages these pick-up disks 25 as the parts are brought toward each other, and flex such disks gradually from their normal chordal condition into the grooves behind them. The pick-up disks thus coöperate with the double separation obtained by the use of the floating element to produce gradual setting of the clutch without grabbing. They also serve to center the floating element.

I claim as my invention:

1. A clutch, comprising a driving member, a relatively shiftable driven member, and a floating element between said driving and driven members, said floating element having separable engagement with both said driving and driven members, said engaging surfaces of said floating element and said driving and driven members being of such shape and material that the floating element separates from the driving member before it separates from the driven member.

2. A clutch, comprising a driving member, a relatively shiftable driven member, a floating element between said driving and driven members, said floating element having separable engagement with both said driving and driven members, said engaging surfaces of said floating element and said driving and driven members being of such shape and material that the floating element separates from the driving member before it separates from the driven member, and a stop member limiting such separating movement between such floating element and the driving member to insure the separation of said floating element from the driven member.

3. A clutch, comprising a driving member having an internal frusto-conical clutch surface, a relatively shiftable driven member having an external frusto-conical surface, and a floating ring between said two frusto-conical surfaces, said floating ring having external and internal layers of friction material for separably engaging said internal and external clutch surfaces respectively.

4. A clutch, comprising a driving member having an internal frusto-conical clutch surface, a relatively shiftable driven member having an external frusto-conical surface, a floating ring between said two frusto-conical surfaces, said floating ring having external and internal layers of friction material for separably engaging said internal and external clutch surfaces respectively, and a stop member limiting the axial movement of said floating ring relative to one of said members.

5. A clutch, comprising a driving member having an internal frusto-conical clutch surface, a relatively shiftable driven member having an external frusto-conical surface, and a floating ring between said two frusto-conical surfaces, said floating ring having external and internal layers of friction material for separably engaging said internal and external clutch surfaces respectively, the coefficients of friction of said friction material with said clutch surfaces and the taper of the clutching surfaces being arranged so that the floating ring separates from said internal clutching surface before it separates from said external clutching surface.

6. A clutch, comprising a driving member having an internal frusto-conical clutch surface, a relatively shiftable driven member having an external frusto-conical surface, and a floating ring between said two frusto-conical surfaces, said floating ring having external and internal layers of friction material for separably engaging said internal and external clutch surfaces respectively, the co-efficients of friction of said friction material with said clutch surfaces and the taper of the clutching surfaces being arranged so that the floating ring separates from one of said clutching surfaces before it separates from the other.

7. A clutch, comprising a driving member having an internal frusto-conical clutch surface, a relatively shiftable driven member having an external frusto-conical surface, a floating ring between said two frusto-conical surfaces, said floating ring having external and internal layers of friction material for separably engaging said internal and external clutch surfaces respectively, the co-efficients of friction of said friction material with said clutch surfaces and the taper of the clutching surfaces being arranged so that the floating ring separates from one of said clutching surfaces before it separates from the other, and a stop member limiting the separating movement of said floating ring relative to the member from which it first separates and thereby insuring separation of said ring from the other member.

8. A clutch, comprising a female driving member, a relatively shiftable male driven member, a floating element between said driving and driven members, said floating element having separable engagement with both said driving and driven members, and resilient pick-up devices between said floating element and one of the other clutch members, said pick-up devices being mounted as chords on one of the female surfaces.

9. A clutch, comprising a driving member having an internal frusto-conical clutch surface, a relatively shiftable driven member having an external frusto-conical surface, a floating ring between said two frusto-conical surfaces, said floating ring having external and internal layers of frictional material for separably engaging said internal and external clutch surfaces respectively, and resilient pick-up devices between said floating ring and one of the other clutch members, said pick-up devices being mounted as chords on one of said internal frusto-conical surfaces.

10. A clutch, comprising a driving member having an internal frusto-conical clutch surface, a relatively shiftable driven member having an external frusto-conical surface, a floating ring between said two frusto-conical surfaces, said floating ring having external and internal layers of friction material for separably engaging said internal and external clutch surfaces respectively, and resilient pick-up devices carried by said driving member for an engagement with the external layer of friction material of said floating ring, said pick-up devices being mounted as chords on the internal frusto-conical surface of said driving member.

In witness whereof, I have hereunto set my hand at Indianapolis, Indiana, this 24th day of July, A. D. one thousand nine hundred and seventeen.

CLARENCE E. JEFFERS.